United States Patent
Cho et al.

(10) Patent No.: US 9,557,839 B2
(45) Date of Patent: Jan. 31, 2017

(54) DISPLAY DEVICE AND DRIVING METHOD THEREOF

(75) Inventors: Se Hyoung Cho, Seoul (KR); Dong-Hyeon Ki, Asan-si (KR); Dong Gyu Kim, Yongin-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 440 days.

(21) Appl. No.: 13/292,224

(22) Filed: Nov. 9, 2011

(65) Prior Publication Data
US 2013/0009930 A1 Jan. 10, 2013

(30) Foreign Application Priority Data

Jul. 8, 2011 (KR) ........................ 10-2011-0067904

(51) Int. Cl.
*G06F 3/041* (2006.01)
*G06F 3/044* (2006.01)
*G09G 3/3233* (2016.01)
*G09G 3/3258* (2016.01)
(Continued)

(52) U.S. Cl.
CPC ........... *G06F 3/0412* (2013.01); *G09G 3/2003* (2013.01); *G09G 3/3225* (2013.01); *G06F 3/041* (2013.01); *G06F 3/044* (2013.01); *G09G 2230/00* (2013.01); *G09G 2300/0426* (2013.01); *G09G 2300/0465* (2013.01); *G09G 2300/0861* (2013.01); *G09G 2310/0245* (2013.01); *G09G 2370/24* (2013.01)

(58) Field of Classification Search
CPC ...... G09G 3/18; G09G 3/3233; G09G 3/3258; G06F 3/042; G06F 3/0412; G06F 3/044
See application file for complete search history.

(56) References Cited

U.S. PATENT DOCUMENTS 7,772,869 B2 * 8/2010 Lee ..................... G09G 3/3648
324/760.01
8,441,456 B2 * 5/2013 Takahashi ............... G06F 3/044
345/104

(Continued)

FOREIGN PATENT DOCUMENTS

JP 2005-196177 7/2005
JP 2009-047964 3/2009
(Continued)

*Primary Examiner* — Srilakshmi K Kumar
*Assistant Examiner* — Carl Adams
(74) *Attorney, Agent, or Firm* — F. Chau & Associates, LLC

(57) ABSTRACT

The embodiments of the present invention relate to a display device and a driving method thereof, wherein the display device according to an exemplary embodiment of the present invention includes a plurality of pixels a voltage transmitting line transmitting a first voltage to a first pixel among the plurality of pixels, a data line transmitting a data voltage to the first pixel, and a plurality of sensing units including a first sensing unit connected to the voltage transmitting line, wherein the first pixel includes a first switching element including an input terminal connected to the voltage transmitting line and a second switching element including an input terminal connected to the data line, and the first sensing unit includes a control switching element including an input terminal connected to the voltage transmitting line.

14 Claims, 16 Drawing Sheets

(51) Int. Cl.
*G09G 3/20* (2006.01)
*G09G 3/32* (2016.01)

(56) References Cited

U.S. PATENT DOCUMENTS

| | | | | |
|---|---|---|---|---|
| 2002/0195967 A1* | 12/2002 | Kim | ............... | G09G 3/3241 315/169.3 |
| 2006/0017710 A1* | 1/2006 | Lee | ............... | G02F 1/13338 345/173 |
| 2006/0097975 A1* | 5/2006 | Lee | ............... | G02F 1/13338 345/98 |
| 2006/0109222 A1* | 5/2006 | Lee | ............... | G02F 1/13338 345/88 |
| 2007/0290963 A1* | 12/2007 | Chen | ............... | G09G 3/3648 345/87 |
| 2009/0135158 A1* | 5/2009 | Takahashi | ............... | G06F 3/044 345/174 |
| 2010/0117980 A1* | 5/2010 | Lee | ............... | G02F 1/13338 345/173 |
| 2010/0194695 A1 | 8/2010 | Hotelling et al. | | |
| 2011/0001711 A1* | 1/2011 | Choi | ............... | G06F 3/042 345/173 |
| 2011/0074727 A1* | 3/2011 | Kim | ............... | G06F 3/0412 345/174 |
| 2011/0169769 A1* | 7/2011 | Takahashi | ............... | G06F 3/044 345/174 |

FOREIGN PATENT DOCUMENTS

| | | |
|---|---|---|
| JP | 2010-145992 | 7/2010 |
| KR | 1020090067376 | 6/2009 |
| KR | 1020090071156 | 7/2009 |
| KR | 10-0957585 | 5/2010 |

* cited by examiner

DISPLAY DEVICE AND DRIVING METHOD THEREOF

CROSS-REFERENCE TO RELATED APPLICATION

This application claims priority to and the benefit of Korean Patent Application No. 10-2011-0067904 filed in the Korean Intellectual Property Office on Jul. 8, 2011, the entire contents of which are herein incorporated by reference.

BACKGROUND (a) Technical Field

The embodiments of the present invention relate to a display device and a driving method thereof, and in detail, to a display device including a sensing unit positioned at a display panel and a driving method of the display device.

(b) Discussion of the Related Art

Flat panel displays include liquid crystal displays and organic light emitting devices. A display device includes a display panel having a plurality of pixels and a plurality of signal lines connected to the pixels. The signal lines include a plurality of gate lines through which gate signals are transmitted, a plurality of data lines through which data voltages are transmitted, and a voltage transmitting line transmitting at least one predetermined voltage. The predetermined voltage includes a driving voltage of the display device. Each pixel includes a switching element, such as a thin film transistor, connected to the gate line and the data line and a pixel electrode connected to the switching element and receiving a data voltage.

Among the display devices, a liquid crystal display includes two display panels formed with two field generating electrodes and a liquid crystal layer interposed between the two display panels. The liquid crystal display applies a voltage between the field generating electrodes to generate an electric field in the liquid crystal layer such that liquid crystal molecules in the liquid crystal layer are aligned in a predetermined direction, thereby displaying images. One of the two field generating electrodes is applied with a predetermined voltage through the voltage transmitting line.

A sensing unit may be included in the display device. When touched by a user's finger, a touch pen, or a light source, such as a laser, the sensing unit outputs a sensing signal. The display device recognizes contact information, such as the existence and position of the contact from the sensing signal.

No image is displayed at the region where the sensing unit is formed, resulting in a loss of aperture ratio and transmittance of the display device.

SUMMARY

The embodiments of the present invention improve the aperture ratio and transmittance of a display device including a sensing unit positioned at a display panel.

A display device according to an exemplary embodiment of the present invention includes a plurality of pixels, a voltage transmitting line through which a first voltage is transmitted to a first pixel among the plurality of pixels, a data line through which a data voltage is transmitted to the first pixel, and a plurality of sensing units including a first sensing unit connected to the voltage transmitting line, wherein the first pixel includes a first switching element including an input terminal connected to the voltage transmitting line and a second switching element including an input terminal connected to the data line, and the first sensing unit includes a control switching element including an input terminal connected to the voltage transmitting line.

The first sensing unit includes a sensing element and a sensing capacitor both connected to a control terminal of the control switching element, and a sensing switching element connected to an output terminal of the control switching element.

The display device further includes a gate line, a reset signal line through which a reset signal is transmitted to the first sensing unit, and a sensing signal line to which a sensing signal is output from the first sensing unit, wherein a control terminal of the sensing element is connected to the gate line, an input terminal of the sensing element is connected to the reset signal line, and an output terminal of the sensing switching element is connected to the sensing signal line.

The display device further includes a reference capacitor connected to the sensing capacitor.

The reset signal includes a reset high voltage and a reset low voltage that is lower than the reset high voltage, and the reset high voltage is transmitted through the reset signal line when a gate-on voltage is transmitted through the gate line.

The display device further includes a sensing signal processor connected to the sensing signal line. The sensing signal processor processes the sensing signal and generates a sensing output signal.

The first sensing unit is positioned between the first pixel and a second pixel adjacent to the first pixel in a row direction.

The plurality of sensing units are arranged so that one sensing unit is disposed for every two pixel rows in a column direction. The first sensing unit is adjacent to both the first pixel and the third pixel adjacent to the first pixel in the column direction.

The plurality of sensing units are arranged so that one sensing unit is disposed for every dot in the row direction. The dot includes at least three pixels, and the voltage transmitting line is connected to the three pixels included in the dot.

The first pixel further includes a liquid crystal capacitor, the liquid crystal capacitor includes a first pixel electrode connected to the first switching element, a second pixel electrode connected to the second switching element, and a liquid crystal layer, and the first voltage is a driving voltage.

The first voltage and a second voltage different from the first voltage are alternately transmitted to the first pixel every at least one frame.

The display device further includes a sensing signal line to which a sensing signal is output from the sensing unit, and a sensing signal processor connected to the sensing signal line. The sensing signal processor processes the sensing signal and generates a sensing output signal, wherein the sensing signal processor includes an integrator integrating the sensing signal, and a switch resetting the integrator after a voltage transmitted through the voltage transmitting line is changed from the first voltage to the second voltage or from the second voltage to the first voltage.

The first sensing unit includes a sensing element connected to a control terminal of the control switching element, a sensing switching element connected to an output terminal of the control switching element, a sensing capacitor connected to the control terminal of the control switching element, and a reference capacitor connected to the sensing capacitor, wherein the reference capacitor is connected to the voltage transmitting line.

The first sensing unit includes a sensing element connected to a control terminal of the control switching element, a sensing switching element connected to an output terminal of the control switching element, a sensing capacitor connected to the control terminal of the control switching element, and a reference capacitor connected to the sensing capacitor, wherein the reference capacitor is connected to a storage electrode line to which a common voltage is applied.

A driving method of a display device including a plurality of pixels, a plurality of gate lines including first and second gate lines, a reset signal line, a sensing signal line, a voltage transmitting line and a data line connected to a first pixel among the plurality of pixels, and a plurality of sensing units each connected to the voltage transmitting line and the first and second gate lines, wherein a sensing unit of the plurality of sensing units includes a sensing element connected to the second gate line and the reset signal line, a control switching element connected to the sensing element and the voltage transmitting line, and a sensing switching element connected to the control switching element and the sensing signal line according to an exemplary embodiment of the present invention comprises transmitting a reset high voltage of a reset signal through the reset signal line to a control terminal of the control switching element, sensing light irradiated to the sensing element, and turning on the sensing switching element to transmit a sensing signal to the sensing signal line.

Transmitting the reset high voltage of the reset signal to the control terminal of the control switching element includes transmitting a gate-on voltage to the second gate line, and transmitting the reset high voltage to the reset signal line.

Sensing the light includes transmitting a gate-off voltage to the first and second gate lines.

Transmitting the sensing signal to the sensing signal line further includes transmitting the gate-on voltage to the first gate line, and the sensing switching element is turned on according to the gate-on voltage transmitted to the first gate line.

The first pixel further includes a liquid crystal capacitor, and the liquid crystal capacitor includes a first pixel electrode connected to a first switching element connected to the voltage transmitting line, a second pixel electrode connected to a second switching element connected to the data line, and a liquid crystal layer.

The method further comprises alternately transmitting a first voltage and a second voltage that is smaller than the first voltage to the first pixel through the voltage transmitting line every at least one frame.

The display device further includes a sensing signal processor. The sensing signal processor processes the sensing signal of the sensing unit and generates a sensing output signal, and the sensing output signal is reset after a voltage transmitted through the voltage transmitting line is changed.

According to an embodiment, there is provided a display device comprising a data line, first and second gate lines, a pixel connected to the data line and the first gate line, a sensing unit adjacent to the pixel, wherein the sensing unit is connected to the first and second gate lines, and a voltage transmitting line connected to the pixel and the sensing unit between the pixel and the sensing unit.

According to the exemplary embodiments of the present invention, the sensing unit in the display device is connected to the voltage transmitting line connected to the switching element of the pixel such that the aperture ratio and the transmittance of the display device may be improved.

DETAILED DESCRIPTION OF THE EMBODIMENTS

Figure 1:
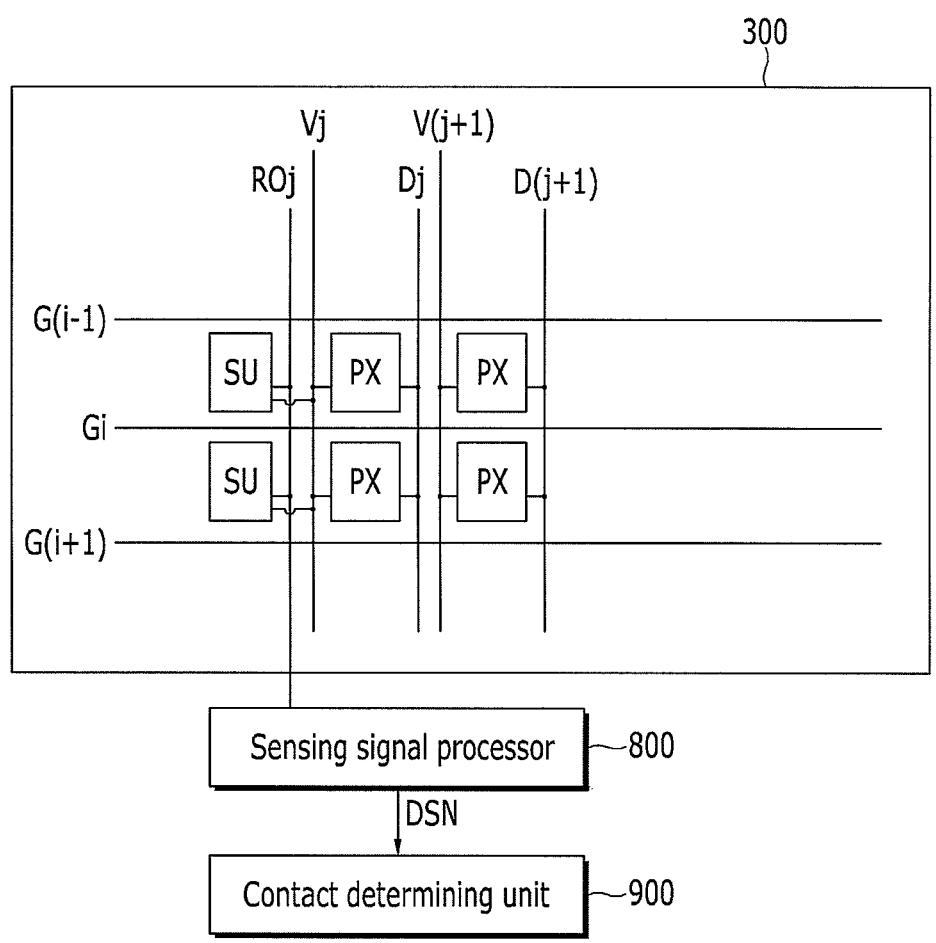
FIG. 1, FIG. 2, and FIG. 3 are block diagrams of display devices according to exemplary embodiments of the present invention.

The embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals may designate like or similar elements throughout the specification and the drawings. It will be understood that when an element such as a layer, film, region, or substrate is referred to as being "on" another element, it can be directly on the other element or intervening elements may also be present.

Display devices according to exemplary embodiments of the present invention will be described with reference to FIG. 1, FIG. 2, and FIG. 3.

Figure 2:
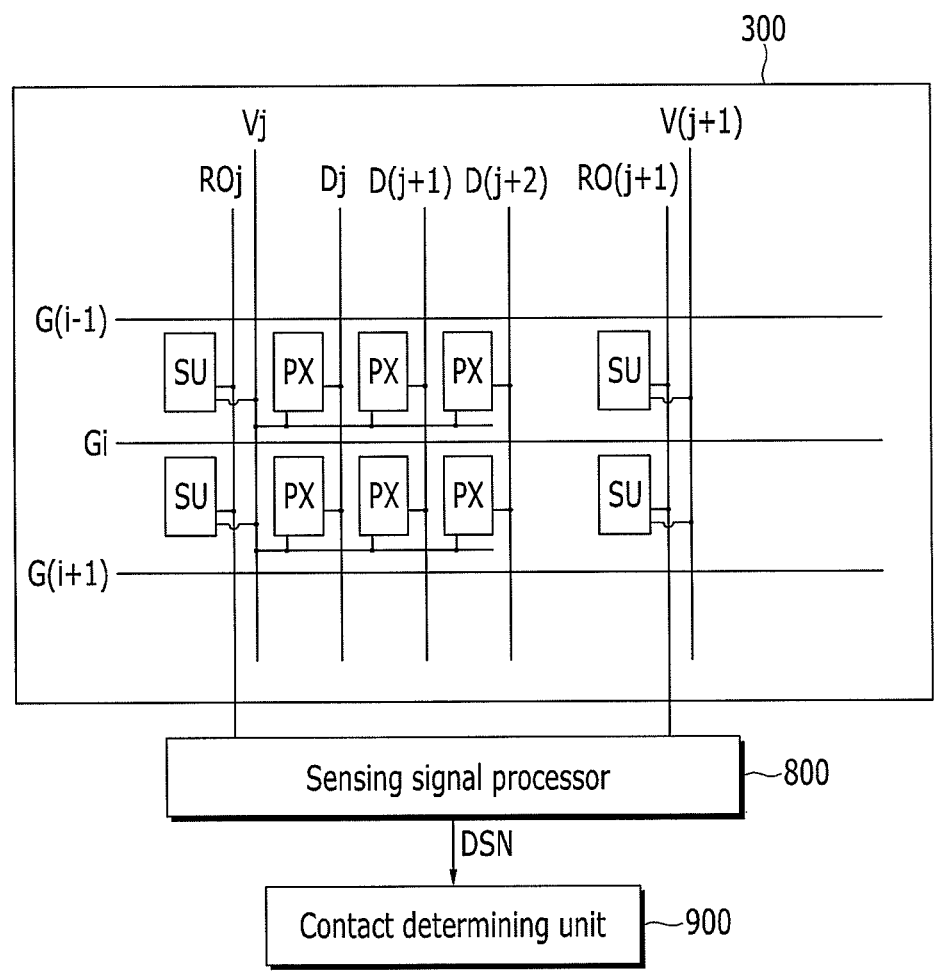
Figure 3:
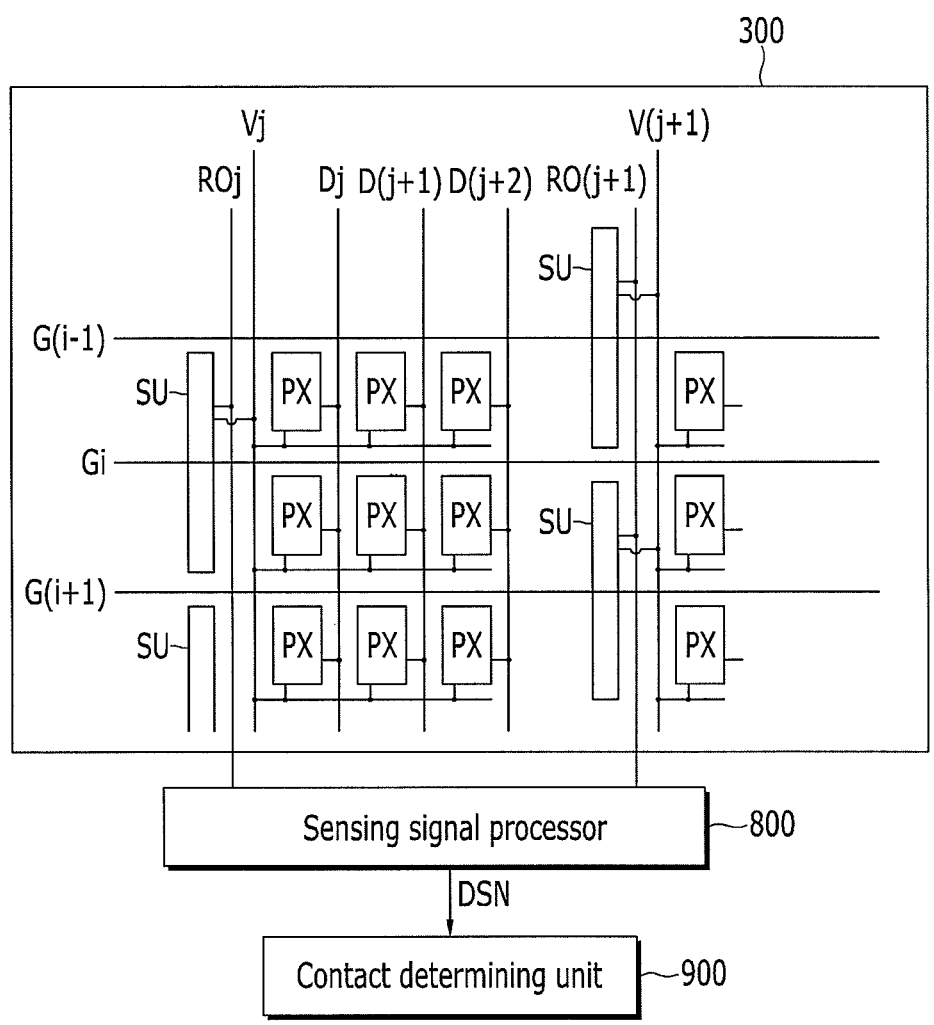

FIG. 1, FIG. 2, and FIG. 3 are block diagrams of display devices according to exemplary embodiments of the present invention.

Referring to FIG. 1, a display device according to an exemplary embodiment of the present invention senses an external contact or an external stimulation, such as light, and includes a display panel 300, a sensing signal processor 800, and a contact determining unit 900.

The display panel 300 includes a plurality of signal lines, a plurality of pixels PX, and a plurality of sensing units SU arranged substantially in a matrix pattern.

The plurality of signal lines include a plurality of gate lines G(i−1), Gi, and G(i+1) (i=1, 2, . . . ) each transmitting a scanning signal (or, a gate signal), a plurality of data lines Dj and D(j+1) (j=1, 2, . . . ) each transmitting a data voltage, a plurality of sensing signal lines ROj (j=1, 2, . . . ), and a plurality of voltage transmitting lines Vj and V(j+1) (j=1, 2, . . . ).

The gate lines G(i−1), Gi, and G(i+1) extend substantially in a row direction in parallel to each other, and the data lines Dj and D(j+1) and the sensing signal lines ROj extend substantially in a column direction. The gate lines G(i−1), Gi, and G(i+1) transmit gate signals that include a gate-on voltage Von and a gate-off voltage Voff.

The sensing signal line ROj is applied with a predetermined reference voltage Vf, and transmits a sensing signal from the sensing unit SU.

The voltage transmitting lines Vj and V(j+1) extend substantially in the column direction. Alternatively, the voltage transmitting lines Vj and V(j+1) extend substantially in the row direction. Referring to FIG. 1, the voltage transmitting lines Vj and V(j+1) are respectively provided at columns of pixels PX (also referred to as "pixel columns"). The voltage transmitting lines Vj and V(j+1) transmit at least a predetermined voltage. For example, the voltage transmitting lines Vj and V(j+1) transmit a driving voltage Vdd of the display device. The driving voltage Vdd includes a maximum DC voltage of various voltages used in the display device. According to an exemplary embodiment, the voltage transmitting lines Vj and V(j+1) alternately transmit a first voltage V1 and a second voltage V2 that is smaller than the first voltage V1 every frame or every few frames. Two voltage transmitting lines Vj and V(j+1) adjacent to each other in the row direction transmit different voltages. The first voltage V1 is a driving voltage Vdd, and the second voltage V2 is a ground voltage or 0V.

The pixels PX include switching elements (not shown) connected to respective corresponding gate lines of the gate lines G(i−1), Gi, and G(i+1) and respective corresponding data lines of the data lines Dj and D(j+1), and pixel electrodes (not shown) respectively connected to the switching elements. For realizing a color, each pixel PX displays one of three primary colors, such as red, green, and blue. At least three pixels PX displaying different colors form one dot. The pixel PX further includes a switching element (not shown) connected to each of the voltage transmitting lines Vj and V(j+1).

The sensing unit SU senses an external contact or light and outputs a sensing signal. For example, the external light is a laser beam generated from a laser pointer.

According to an embodiment, each sensing unit SU is disposed between two pixels PX adjacent to each other in the row direction. According to an embodiment, one sensing unit SU is disposed for every pixel PX column in the row direction, and one sensing unit SU is disposed for every pixel row or every two pixel rows in the column direction.

The sensing unit SU includes a switching element (not shown) connected to the voltage transmitting line Vj and a switching element (not shown) connected to the sensing signal line ROj.

The sensing signal processor 800 is connected to the sensing signal line ROj of the display panel 300 and receives an analog sensing signal from the sensing signal line ROj for signal processing. The sensing signal processor 800 converts the analog sensing signal to a digital sensing signal DSN.

The contact determining unit 900 receives the digital sensing signal DSN from the sensing signal processor 800, processes the digital sensing signal DSN, and determines whether there is a contact and where the contact is positioned, thereby generating contact information.

Referring to FIG. 2, a display device according to an exemplary embodiment is provided that includes a display panel 300. The display device shown in FIG. 2 is substantially the same as the display device shown in FIG. 1 except for the arrangement of the voltage transmitting lines, pixels PX, and sensing units SU.

The display panel 300 includes a plurality of voltage transmitting lines Vj and V(j+1) provided so that one voltage transmitting line is disposed for every three pixel columns. Three neighboring pixels PX that form a dot are positioned between two neighboring voltage transmitting lines Vj and V(j+1) and respectively display different colors. The three pixels PX included in one dot are connected to one voltage transmitting line Vj or V(j+1). Alternatively, four or more pixels PX respectively displaying different colors form one dot and are connected to one voltage transmitting line Vj or V(j+1).

A sensing unit SU is disposed for every three pixels PX or for every four or more pixels PX in the row direction, and a sensing unit SU is disposed for every pixel row in the column direction. Each sensing unit SU includes a switching element (not shown) connected to an adjacent voltage transmitting lines Vj or V(j+1) and a switching element (not shown) connected to an adjacent sensing signal line ROj or RO(j+1).

Referring to FIG. 3, a display device according to an exemplary embodiment is provided. The display device shown in FIG. 3 is substantially the same as the display device shown in FIG. 2 except for the arrangement and size of the sensing unit SU.

A sensing unit SU is disposed for every two pixel PX rows in the column direction, and one sensing unit SU is disposed adjacent to two pixel rows in parallel to the two pixel rows. Two sensing unit SU columns adjacent to each other in the row direction are not aligned in the row direction. For example, a first sensing unit SU in a first sensing unit column is opposite to second and third pixels PX in a first pixel column, and a second sensing unit SU in a second sensing unit column adjacent to the first sensing unit column is opposite to first and second pixels PX or third and fourth pixels PX in a second pixel column adjacent to the first pixel column.

Figure 4:
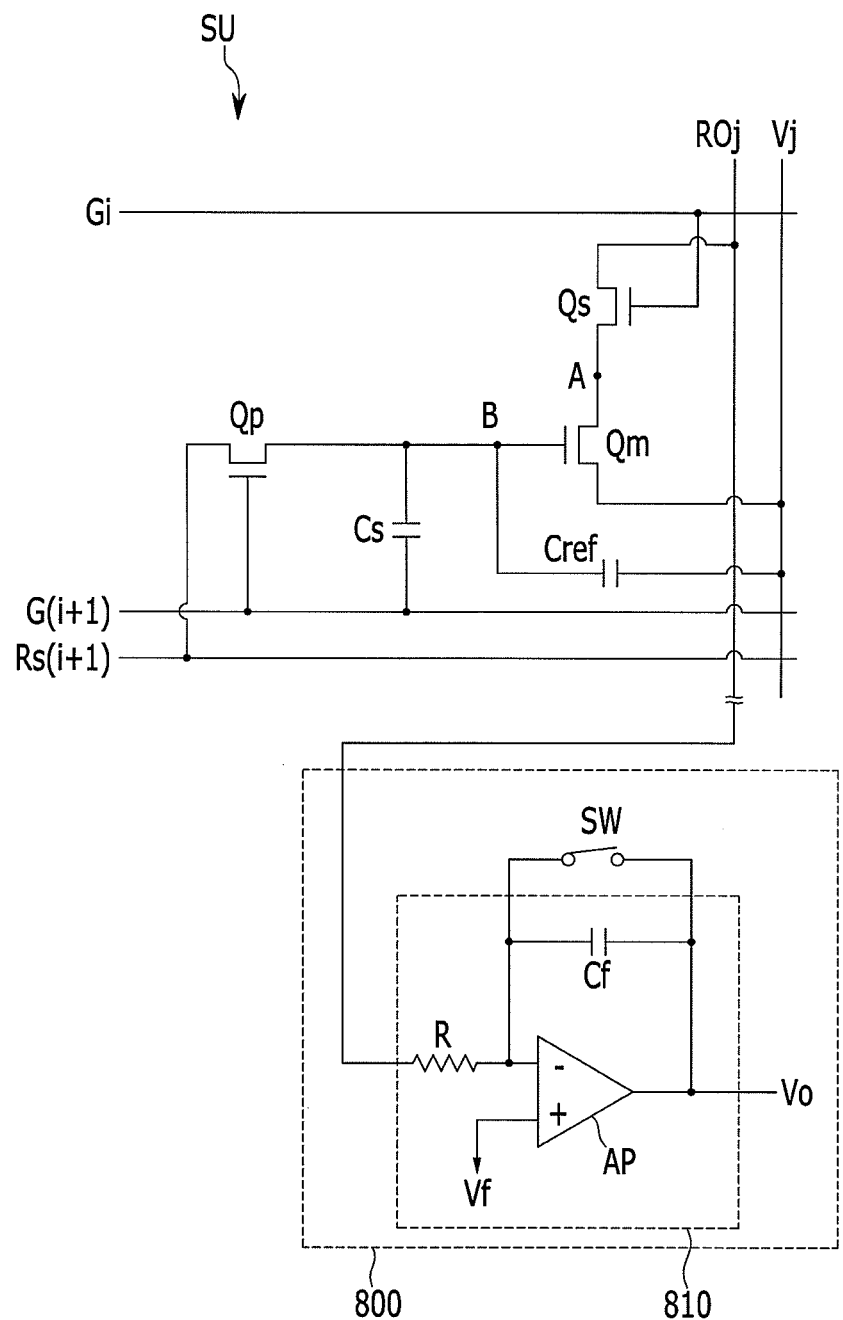
FIG. 4 is an equivalent circuit diagram of a sensing unit and a sensing signal processor of a display device according to an exemplary embodiment of the present invention.
Figure 5:
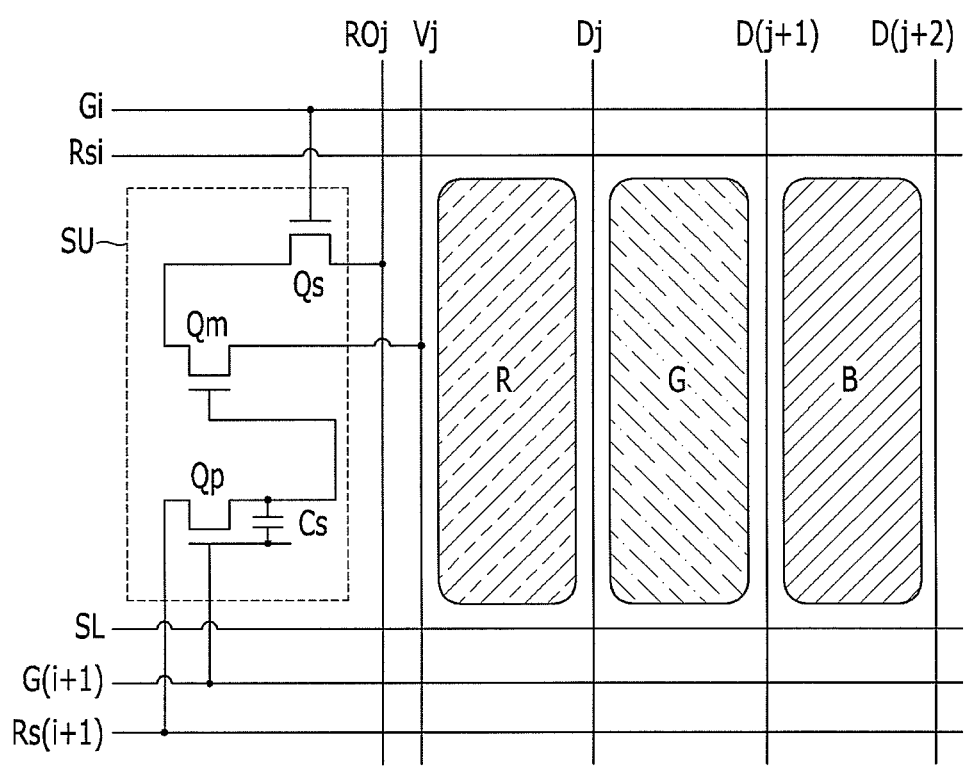
FIG. 5 is a layout view of a sensing unit and a plurality of pixels of a display device according to an exemplary embodiment of the present invention.
Figure 6:
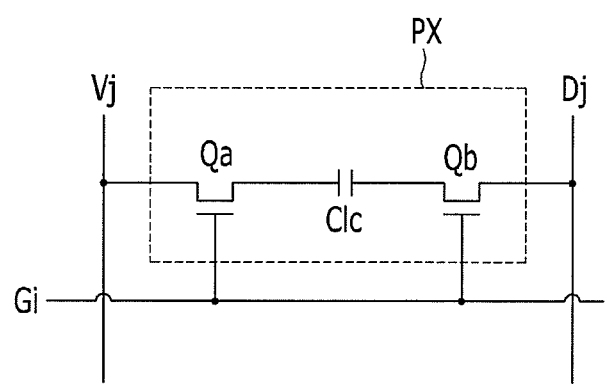
FIG. 6 is an equivalent circuit diagram of one pixel of a display device according to an exemplary embodiment of the present invention.

Next, detailed structures of the display panels 300 and sensing signal processors 800 of the display devices shown in FIG. 1, FIG. 2, and FIG. 3 are described with reference to FIG. 4, FIG. 5, and FIG. 6 as well as FIG. 1 to FIG. 3. FIG. 4 is an equivalent circuit diagram of a sensing unit and sensing signal processor of a display device according to an exemplary embodiment of the present invention, FIG. 5 is a layout view of a sensing unit and a plurality of pixels of a display device according to an exemplary embodiment of the present invention, and FIG. 6 is an equivalent circuit diagram of one pixel of a display device according to an exemplary embodiment of the present invention.

Referring to FIG. 4, a sensing unit SU of a display device according to an exemplary embodiment of the present invention includes a sensing element Qp connected to the gate line G(i+1) and the reset signal line Rs(i+1), a sensing capacitor Cs connected to the sensing element Qp and the gate line G(i+1), a control switching element Qm connected to the sensing element Qp, and a sensing switching element Qs connected to a reference capacitor Cref and the control switching element Qm.

The reset signal line Rs(i+1) that is synchronized with the neighboring gate line G(i+1) transmits a reset high voltage when a gate-on voltage Von is applied to the gate line G(i+1). The reset signal line Rs(i+1) transmits a reset low voltage that is smaller than the reset high voltage when a gate-off voltage Voff is applied to the gate line G(i+1). The reset high voltage and the reset low voltage are referred to as reset signals.

The gate lines Gi and G(i+1), the sensing signal line ROj, and the voltage transmitting line Vj were previously described with reference to FIGS. 1 to 3.

The sensing element Qp, the control switching element Qm, and the sensing switching element Qs are three terminal elements such as thin film transistors.

The sensing element Qp includes a control terminal connected to the gate line G(i+1), an input terminal connected to the reset signal line Rs(i+1), and an output terminal connected to a node B. The sensing element Qp transmits the reset high voltage of the reset signal line Rs(i+1) to the node B according to a gate signal of the gate line G(i+1). The sensing element Qp is a sensing element that creates a leakage current according to irradiated light.

The control switching element Qm includes a control terminal connected to the node B, an input terminal connected to the voltage transmitting line Vj, and an output terminal connected to the sensing switching element Qs. The control switching element Qm transmits the first voltage V1 or the second voltage V2 of the voltage transmitting line Vj to a node A according to the voltage of the node B connected to the control terminal of the control switching element Qm.

The sensing switching element Qs includes a control terminal connected to the gate line Gi, an input terminal connected to the output terminal of the control switching element Qm, for example, the node A, and an output terminal connected to the sensing signal line ROj. The sensing switching element Qs transmits a voltage of the node A connected to the input terminal of the sensing switching element Qs to the sensing signal line ROj according to a gate signal of the gate line Gi. As a result, a current flows through the sensing signal line ROj. The current is determined according to a voltage difference of the reference voltage and the voltage of the node A as a sensing signal.

Two terminals of the sensing capacitor Cs are respectively connected to the output terminal of the sensing element Qp, for example, the node B, and the gate line G(i+1). The sensing capacitor Cs is charged with a reset high voltage according to the gate signal of the gate line G(i+1) and discharged depending on a photocurrent of the sensing element Qp.

Two terminals of the reference capacitor Cref are connected to the output terminal of the sensing element Qp, for example, the node B, and the voltage transmitting line Vj. The reference capacitor Cref is connected to the sensing capacitor Cs in series and determines the voltage of the node B along with the sensing capacitor Cs.

The sensing signal processor 800 of the display device is connected to the sensing signal line ROj of the display panel 300. According to an embodiment, the sensing signal processor 800 includes a plurality of integrators 810 respectively connected to a plurality of sensing signal lines ROj and a plurality of switches SW respectively connected to the plurality of integrators.

The integrator 810 includes an amplifier AP having an inversion terminal (−), a non-inversion terminal (+), and an output terminal, a resistor R, and a capacitor Cf connected to the amplifier AP and the resistor R. The inversion terminal (−) of the amplifier AP is connected to the sensing signal line ROj through the resistor R, and the capacitor Cf is connected between the inversion terminal (−) and the output terminal. The non-inversion terminal (+) of the amplifier AP of the integrator 810 is connected to the reference voltage Vf. The amplifier AP and the capacitor Cf function as a current integrator and integrate the current of the sensing signal from the sensing signal line ROj during a predetermined time (e.g., one frame) to generate a sensing output signal Vo.

The switch SW is connected between the inversion terminal (−) and the output terminal of the amplifier AP. When the switch SW is turned on, the integrator 810 is reset such that the sensing output signal Vo has an initial value, for example a reference voltage Vf. The switch SW is turned on every frame.

Referring to FIG. 5, a sensing unit of a display device according to an exemplary embodiment of the present invention is provided, which is substantially the same as the sensing unit SU shown in FIG. 4 except that the reference capacitor Cref is not included. A sensing unit SU is disposed for every three pixels PX or every four or more pixels PX in the row direction as shown in FIG. 2. The three or more neighboring pixels PX include red, green, and blue pixels R, G, and B. The display device further includes a storage electrode line SL parallel to the gate lines Gi and G(i+1). The storage electrode line SL transmits a predetermined voltage, such as a common voltage Vcom. The reset voltage lines Rsi and Rs(i+1) form pairs along with the gate lines Gi and G(i+1), respectively.

Referring to FIG. 6, a pixel PX, which is a unit for displaying an image, includes a switching element connected to the voltage transmitting line Vj. The pixel PX includes a first switching element Qa connected to the gate line Gi and the voltage transmitting line Vj, a second switching element Qb connected to the gate line Gi and the data line Dj, and a liquid crystal capacitor Clc connected to the first and second switching elements Qa and Qb. The pixel PX further includes at least one storage capacitor to maintain a pixel voltage applied to the liquid crystal capacitor Clc. The liquid crystal capacitor Clc includes a liquid crystal layer as a dielectric material, and two terminals of the liquid crystal capacitor Clc include a first pixel electrode connected to the first switching element Qa and a second pixel electrode connected to the second switching element Qb. The first and second pixel electrodes are positioned on the same substrate (not shown).

Next, a driving method including a display operation and a sensing operation of a display device according to an exemplary embodiment is described with reference to FIG. 7, FIG. 8, and FIG. 9 as well as FIG. 1 to FIG. 6.

Figure 7:
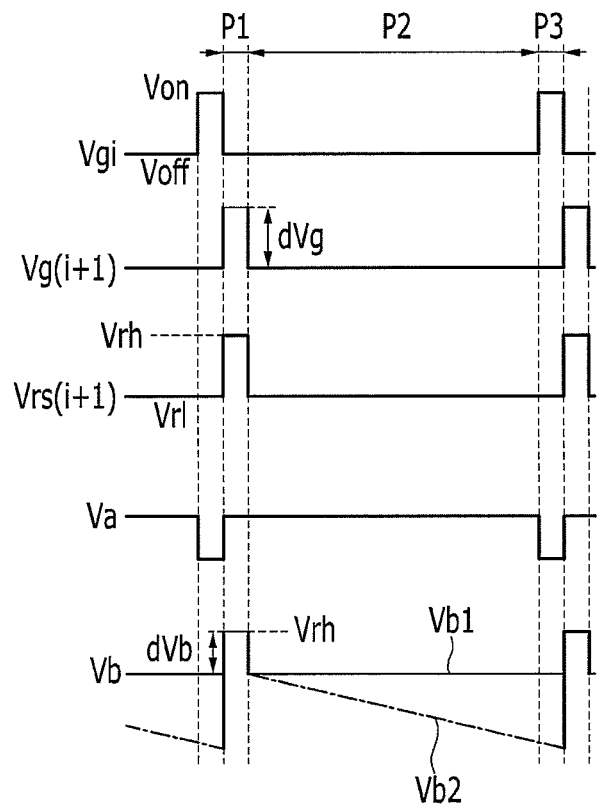
FIG. 7 is a waveform diagram of various driving signals of a display device according to an exemplary embodiment and voltages of some nodes in a sensing unit.
Figure 8:
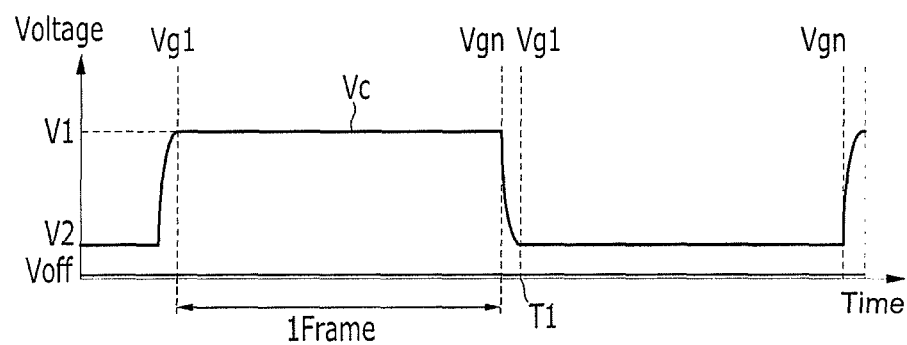
FIG. 8 is a waveform diagram of a gate signal of a display device according to an exemplary embodiment of the present invention and a voltage of a voltage transmitting line.

FIG. 7 is a waveform diagram of various driving signals of a display device according to an exemplary embodiment and voltages of some nodes in a sensing unit, and FIG. 8 is a waveform diagram of a gate signal of a display device according to an exemplary embodiment of the present invention and a voltage of a voltage transmitting line.

Referring to FIG. 6 and FIG. 7, according to a display operation, a plurality of gate lines G(i−1), Gi, and G(i+1) are sequentially applied with the gate-on voltages Von to turn on the switching elements of the pixels PX connected to the gate lines G(i−1), Gi, and G(i+1).

Referring to FIG. 6, the gate line Gi is applied with the gate-on voltage Von, the first switching element Qa and the second switching element Qb connected to the gate line Gi are turned on. Thus, a voltage of the voltage transmitting line Vj and a voltage of the data line Dj are applied to respective terminals of the liquid crystal capacitor Clc. When the first voltage or the second voltage of the voltage transmitting line Vj is applied to one terminal of the liquid crystal capacitor Clc through the first switching element Qa, and the other terminal of the liquid crystal capacitor Clc is applied with the data voltage, a difference between the voltages of the two terminals of the liquid crystal capacitor Clc is represented as a charging voltage of the liquid crystal capacitor Clc, that is, a pixel voltage. When a potential difference is generated between both terminals of the liquid crystal capacitor Clc, liquid crystal molecules in the liquid crystal capacitor Clc are arranged such that the long axis of the molecules are inclined parallel to a direction of an electric field created by the potential difference. An inclined degree is changed according to the magnitude of the pixel voltage. Thus, the degree of polarization of light passing through the liquid crystal layer is changed according to the inclination degree of the liquid crystal molecules, and thereby the transmittance of the light is changed and the pixel PX displays an image having a predetermined luminance value.

The gate-on voltage Von is sequentially applied to all of the gate lines Gi and G(i+1) such that all of the pixels PX display images during one frame.

Next, a sensing operation is described with reference to FIG. 4 and FIG. 7.

When the gate signal Vg(i+1) transmitted by the gate line G(i+1) becomes the gate-on voltage Von, the reset signal Vrs(i+1) of the reset signal line Rs(i+1) forming a pair along with the gate line G(i+1) simultaneously becomes the reset high voltage Vrh. Thus, the sensing element Qp is turned on such that the voltage Vb of the node B becomes the reset high voltage Vrh. When the voltage of the node B reaches a voltage that may sufficiently turn on the control switching element Qm, the control switching element Qm is also turned on such that the voltage of the voltage transmitting line Vj is applied to the node A. When the voltage of the voltage transmitting line Vj is the first voltage or the second voltage, the voltage Va of the node A is the first voltage or the second voltage. According to an embodiment, the first voltage is a driving voltage (e.g., 15V), and the second voltage is a ground voltage (e.g., 0V). A period during which the reset high voltage Vrh is applied to the control terminal of the control switch element Qm is referred to as a reset period P1. During the reset period P1, the sensing switching element Qs is turned off.

Next, when the gate-off voltage Voff is applied to the gate line G(i+1), the reset low voltage Vrl is simultaneously applied to the reset signal line Rs(i+1) forming a pair together with the gate line G(i+1). When a difference between the gate-on voltage Von and the gate-off voltage Voff applied to the gate line G(i+1) is referred to as a first voltage difference dVg, the voltage Vb of the node B is decreased by a second voltage difference dVb which is determined by Equation 1. In Equation 1, the capacitances of the capacitors are indicated by the reference characters of the capacitors.

$$dVb = dVg * Cs/(Cref + Cs)$$ [Equation 1]

When light of a light source, such as, a laser pointer is irradiated to the sensing element Qp, a light leakage current is generated at the sensing element Qp. Thus, as shown in FIG. 7, the voltage Vb of the node B is decreased to have a voltage curve Vb2, and the sensing capacitor Cs is discharged. When light is not irradiated to the sensing element Qp (or, surrounding light is blocked by a finger contact), as shown in FIG. 7, the voltage Vb of the node B has a voltage curve Vb1 as shown in FIG. 7 and remains constant. When the voltage Vb of the node B is sufficient for turning on the control switching element Qm, the voltage of the voltage transmitting line Vj is continuously transmitted to the node A. The period during which the voltage Vb has the decreasing or constant voltage curve Vb2 after the reset period P1 is referred to a light sensing period P2.

Next, the gate-on voltage Von is applied to the other gate lines after the gate line G(i+1) during the current frame, and a next frame is started. When the gate-on voltage Von is the gate signal Vgi of the gate line Gi, the sensing switching element Qs connected to the gate line Gi is turned on. Thus, the voltage Va of the node A becomes a voltage (e.g., 5V) applied to the sensing signal line ROj. According to a voltage of the node B, the on/off state of the control switching element Qm is determined, and a current flowing through the sensing signal line ROj is changed. The period during which the gate-on voltage Von is the gate signal Vgi of the gate line Gi after the light sensing period P2 is referred to as an output period P3.

The current flowing from the sensing switching element Qs to the sensing signal line ROj as a sensing signal is integrated by the integrator 810 of the sensing signal processor 800, and the integrated signal is output as the sensing output signal Vo. The current flowing through the sensing signal line ROj is determined by the voltage applied to the sensing signal line ROj and the voltage Vb of the node B, for example, the reset high voltage Vrh, and according to whether light is irradiated to the sensing element Qp. For example, the sensing output signal Vo is determined by the reset high voltage Vrh, the leakage current of the sensing element Qp, and the voltage applied to the sensing signal line ROj.

When one frame is finished, a next frame is started, and the polarity of a data voltage applied to each pixel PX with respect to the common voltage Vcom (hereinafter, referred to as a polarity of the data voltage) becomes opposite to the polarity of a data voltage applied to the pixel PX during a previous frame. A voltage transmitted through the voltage transmitting line Vj is also changed every frame or every few frames.

Referring to FIG. 8, a voltage Vc of the voltage transmitting line Vj is alternately changed every frame. For example, the voltage Vc of the voltage transmitting line Vj has one of the first voltage V1 and the second voltage V2, and is alternately changed every frame. The term "one frame" refers to a period from an application time of a gate-on voltage Vg1 of the first gate line G1 to an application time of a gate-on voltage VGn of the final gate line Gn.

According to the exemplary embodiment described in connection with FIG. 4, when the voltage of the voltage transmitting line Vj is changed, the voltage Vb of the node B may be changed by a parasitic capacitance of the reference capacitor Cref. As a result, although no light is irradiated to the sensing element Qp, the voltage Vb of the node B is changed, thereby resulting in a contact error. According to an exemplary embodiment of the present invention, the contact error is prevented by utilizing a reset time T1 for resetting the integrator 810 by turning on the switch SW connected to the integrator 810 before or simultaneously with application of the gate-on voltage Vg1 to the first gate line G1 and after the voltage of the voltage transmitting line Vj is changed.

Figure 9:
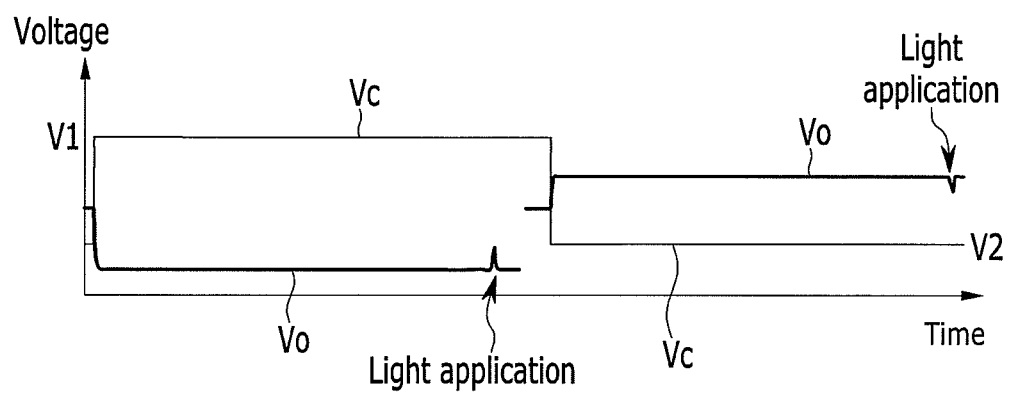
FIG. 9 is a waveform diagram of a change in a sensing output signal of a sensing unit of a display device according to an exemplary embodiment of the present invention.

FIG. 9 is a waveform diagram showing a change in a sensing output signal of a sensing unit of a display device according to an exemplary embodiment of the present invention.

Referring to FIG. 9, while the voltage Vc of the voltage transmitting line Vj is the first voltage V1, the sensing output signal Vo of the sensing signal processor 800 maintains substantially a constant voltage when no external contact or light application exists, and upon light application, the sensing output signal Vo is changed (e.g., increases). When the voltage Vc of the voltage transmitting line Vj is changed to the second voltage V2 that is lower than the first voltage V1, the sensing output signal Vo is changed and maintains substantially a constant voltage until there is a light application which causes the sensing output signal Vo to be changed (e.g., decreased).

Next, a structure of a display device according to an exemplary embodiment of the present invention is described with reference to FIG. 10 and FIG. 11.

Figure 10:
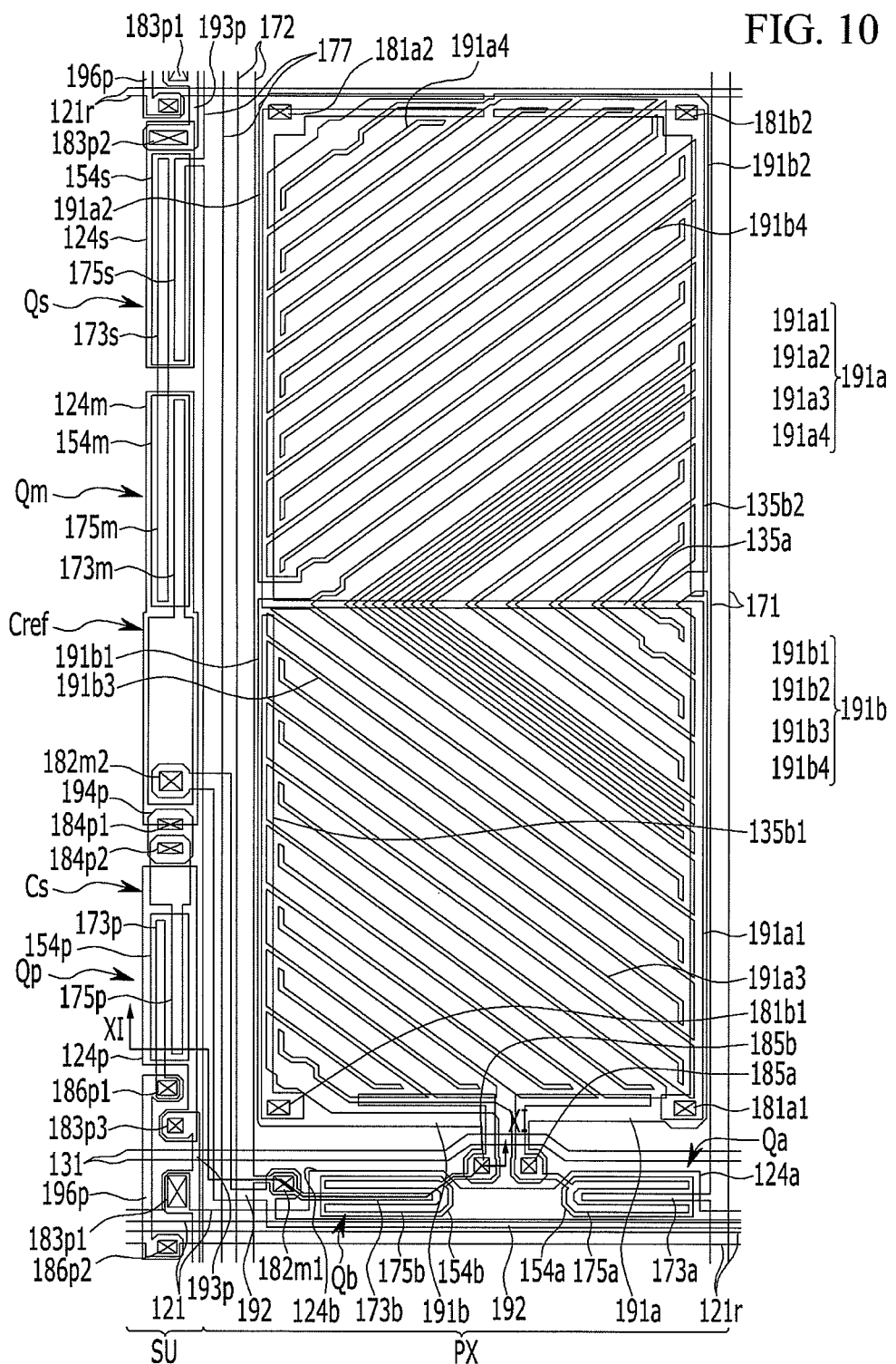
FIG. 10 is a layout view of a sensing unit and a neighboring pixel of a display device according to an exemplary embodiment of the present invention.
Figure 11:
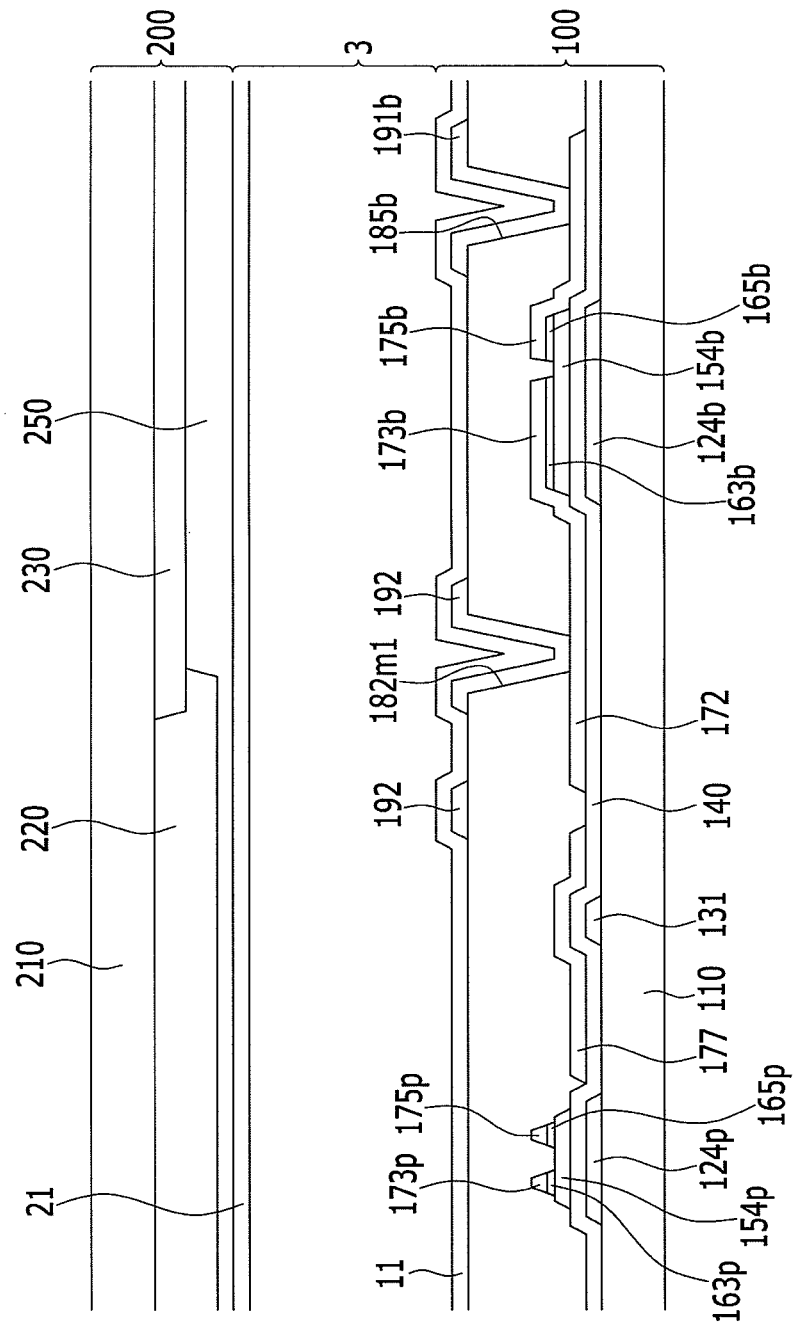
FIG. 11 is a cross-sectional view taken along the line XI-XI of FIG. 10.

FIG. 10 is a layout view of a sensing unit and a neighboring pixel of a display device according to an exemplary embodiment of the present invention, and FIG. 11 is a cross-sectional view taken along with line XI-XI of FIG. 10.

Referring to FIG. 10 and FIG. 11, a display device according to an exemplary embodiment of the present invention includes a lower panel 100 and an upper panel 200 facing each other, and a liquid crystal layer 3 interposed between the two display panels 100 and 200.

The lower panel 100 is described.

A plurality of gate conductors including a plurality of gate lines 121, a plurality of reset signal lines 121r, a plurality of storage electrode lines 131, a plurality of pairs of connection conductors 135a, 135b1, and 135b2, a light sensing gate electrode 124p, a control gate electrode 124m, and a sensing gate electrode 124s are formed on a substrate 110 made of glass or plastic.

The gate lines 121 transmit gate signals. The gate lines 121 extend in a transverse direction. Each gate line 121 includes a plurality of pairs of a first gate electrode 124a and a second gate electrode 124b. The reset signal line 121r transmits a reset signal including a reset high voltage Vrh and a reset low voltage Vrl. The reset signal line 121r extends in the transverse direction.

The reset signal line 121r is adjacent to the gate line 121.

The storage electrode line 131 receives a predetermined voltage. The storage electrode line 131 extends in the transverse direction.

The connection conductors 135a, 135b1, and 135b2 are positioned between the reset signal line 121r and storage electrode line 131 adjacent to each other.

The light sensing gate electrode 124p, the control gate electrode 124m, and the sensing gate electrode 124s each having an island shape are positioned between two gate lines 121 adjacent to each other.

A gate insulating layer 140 made of silicon nitride SiNx or silicon oxide SiOx is formed on the gate conductor.

A plurality of pairs of a first semiconductor 154a and a second semiconductor 154b, a light sensing semiconductor 154p, a control semiconductor 154m, and a sensing semiconductor 154s made of hydrogenated amorphous silicon or polysilicon are formed on the gate insulating layer 140. The first semiconductor 154a, the second semiconductor 154b, the light sensing semiconductor 154p, the control semiconductor 154m, and the sensing semiconductor 154s are respectively positioned on the first gate electrode 124a, the second gate electrode 124b, the light sensing gate electrode 124p, the control gate electrode 124m, and the sensing gate electrode 124s.

Pairs of ohmic contacts 163b and 165b, and 163p and 165p are formed on the semiconductors 154b and 154p, respectively, and pairs of ohmic contacts (not shown) are formed on the semiconductors 154a, 154m, and 154s, respectively. The ohmic contacts 163b, 163p, 165b, and 165p are made of a material, such as silicide or n+ hydrogenated amorphous silicon in which an n-type impurity, such as phosphorus, is doped at a high concentration. According to an exemplary embodiment of the present invention, the ohmic contacts 163b, 163p, 165b, and 165p are omitted when the semiconductors 154a, 154b, 154p, 154m, and 154s include an oxide semiconductor.

A data conductor including a data line 171 and a voltage transmitting line 172, a plurality of pairs of a first drain electrode 175a and a second drain electrode 175b, a sensing signal line 177, a light sensing source electrode 173p, a light sensing drain electrode 175p, a control source electrode 173m, a control drain electrode 175m, a sensing source electrode 173s connected to the control drain electrode 175m, and a sensing drain electrode 175s is formed on the ohmic contacts 163b, 163p, 165b, and 165p and the gate insulating layer 140.

The data line 171 transmits a data signal. The data line 171 extends in a longitudinal direction intersecting the gate line 121. The data line 171 includes a first source electrode 173a protruding toward the first gate electrode 124a.

The voltage transmitting line 172 alternately transmits a voltage of a predetermined magnitude or the first voltage and the second voltage. The voltage transmitting line 172 extends parallel to the data line 171, thereby intersecting the gate line 121. The voltage transmitting line 172 includes a second source electrode 173b protruding toward the second gate electrode 124b. The voltage transmitting lines 172 adjacent to each other transmit different voltages every one or more frames.

The first drain electrode 175a and the second drain electrode 175b are curved to enclose the first source electrode 173a and the second source electrode 173b, respectively.

The sensing signal line 177 transmits a predetermined reference voltage. The sensing signal line 177 is parallel to the voltage transmitting line 172.

The light sensing source electrode 173p and light sensing drain electrode 175p each having an island shape are opposite to each other on the light sensing gate electrode 124p. The light sensing drain electrode 175p includes one end of a bar type and an expansion having a wide area. The expansion of the light sensing drain electrode 175p overlaps a portion of the light sensing gate electrode 124p (e.g., an upper portion of the light sensing gate electrode 124p) via the gate insulating layer 140, thereby forming the sensing capacitor Cs.

The control source electrode 173m and the control drain electrode 175m each having an island shape are opposite to each other on the control gate electrode 124m. The control source electrode 173m includes one end of a bar type and an expansion having a wide area. The control source electrode 173m overlaps a portion of the control gate electrode 124m (e.g., a lower portion of the control gate electrode 124m) via the gate insulating layer 140, thereby forming the reference capacitor Cref.

The sensing source electrode 173s is connected to the upper portion of the control drain electrode 175m. The sensing source electrode 173s faces the sensing drain electrode 175s on the sensing gate electrode 124s. The sensing drain electrode 175s is connected to the sensing signal line 177.

The first gate electrode 124a, the first source electrode 173a, and the first drain electrode 175a form a first thin film transistor (TFT) Qa along with the first semiconductor 154a.

The second gate electrode 124b, the second source electrode 173b, and the second drain electrode 175b form a second thin film transistor Qb along with the second semiconductor 154b. The light sensing gate electrode 124p, the light sensing source electrode 173p, and the light sensing drain electrode 175p form a sensing element Qp, which is a thin film transistor, along with the light sensing semiconductor 154p. The control gate electrode 124m, the control source electrode 173m, and the control drain electrode 175m form a control thin film transistor Qm along with the control semiconductor 154m. The sensing gate electrode 124s, the sensing source electrode 173s, and the sensing drain electrode 175s form a sensing thin film transistor Qs along with the sensing semiconductor 154s. The first thin film transistor functions as the first switching element Qa, the second thin film transistor functions as the above-described second switching element Qb, the sensing element Qp functions as the above-described sensing element Qp, the control thin film transistor Qm functions as the above-described control switching element Qm, and the sensing thin film transistor Qs functions as the above-described sensing switching element Qs.

The ohmic contacts 163b, 163p, 165b, and 165p are interposed between the underlying semiconductors 154a, 154b, 154p, 154m, and 154s and the overlying data conductors 171, 172, 175a, 175b, 177, 173p, 175p, 173m, 175m, 173s, and 175s, and reduce contact resistance between the underlying semiconductors and overlying data conductors.

A passivation layer 182 made of an inorganic insulator or an organic insulator is formed on the data conductors 171, 172, 175a, 175b, 177, 173p, 175p, 173m, 175m, 173s, and 175s and the exposed semiconductors 154a, 154b, 154p, 154m, and 154s.

The passivation layer 182 has a plurality of contact holes 185a and 185b exposing the expansions of the first drain electrode 175a and the second drain electrode 175b, a plurality of contact holes 182m1 and 182m2 exposing a portion of the second source electrode 173b and the expansion of the control source electrode 173m, a plurality of contact holes 184p2 exposing the expansion of the light sensing drain electrode 175p, and a plurality of contact holes 186p1 exposing a portion of the light sensing source electrode 173p. The passivation layer 182 and the gate insulating layer 140 have a plurality of contact holes 181a1, 181a2, 181b1, and 181b2 exposing portions of the connection conductors 135a, 135b1, and 135b2, a contact hole 186p2 exposing a portion of the reset signal line 121r, a contact hole 183p1 exposing a portion of the gate line 121, a contact hole 183p2 exposing a portion of the sensing gate electrode 124s, a contact hole 183p3 exposing a portion of the light sensing gate electrode 124p, and a contact hole 184p1 exposing a portion of the control gate electrode 124m (e.g., a lower portion of the control gate electrode 124m).

A plurality of pairs of first and second pixel electrodes 191a and 191b and a plurality of bridges 192, 193p, 194p, and 196p made of a transparent conductive material, such as indium tin oxide (ITO) or indium zinc oxide (IZO), or a reflective metal, such as aluminum, silver, chromium, or alloys thereof, are formed on the passivation layer 182.

As shown in FIG. 10, the overall contour of the first and second pixel electrodes 191a and 191b has a quadrangle shape, and the first and second pixel electrodes 191a and 191b engage with each other. The first and second pixel electrodes 191a and 191b are symmetrical with each other with respect to a virtual transverse center line.

The first pixel electrode 191a includes a lower stem 191a1, an upper stem 191a2, and a plurality of branches 191a3 and 191a4 respectively extending from the lower stem 191a1 and the upper stem 191a2. The second pixel electrode 191b includes a lower stem 191b1, an upper stem 191b2, and a plurality of branches 191b3 and 191b4 respectively extending from the lower stem 191b1 and the upper stem 191b2. The lower stem 191a1 of the first pixel electrode 191a is connected to the connection conductor 135a through the contact hole 181a1, and the upper stem 191a2 is connected to the connection conductor 135a through the contact hole 181a2. The lower stem 191b1 of the second pixel electrode 191b is connected to the connection conductor 135b1 through the contact hole 181b1, and the upper stem 191b2 is connected to the connection conductor 135b2 through the contact hole 181b2.

Angles of the plurality of branches 191a2, 191a4, 191b2, and 191b4 of the first pixel electrode 191a and the second pixel electrode 191b with respect to a transverse center line are about 45 degrees.

The branches of the first pixel electrode 191a and the second pixel electrode 191b are spaced apart from each other with a predetermined interval and alternately disposed with respect to each other. The first and second pixel electrodes 191a and 191b include regions each of which is positioned between the branches 191a3 and 191b3 adjacent to each other or between the branches 191a4 and 191b4 adjacent to each other. Some of the regions, which are positioned at a center of the first and second pixel electrodes 191a and 191b, have a relatively smaller width, and the others of the regions have a relatively larger width. As shown in FIG. 10, by arranging the regions with different intervals between the branches 191a3 and 191b3 or between the branches 191a4 and 191b4, it can be possible to obtain various inclination angles of the liquid crystal molecules in the liquid crystal layer 3 together with increased side visibility and transmittance.

The first pixel electrode 191a and the second pixel electrode 191b according to the exemplary embodiments of the present invention are not limited to having the shape shown in FIG. 10, and may have any other shapes as long as the first pixel electrode 191a and the second pixel electrode 191b are alternately formed at different layers.

The first pixel electrode 191a is physically and electrically connected to the first drain electrode 175a through the contact hole 185a and receives a data voltage from the first drain electrode 175a. The second pixel electrode 191b is physically and electrically connected to the second drain electrode 175b through the contact hole 185b and receives a transmitted voltage from the voltage transmitting line 172. The first pixel electrode 191a and the second pixel electrode 191b form the liquid crystal capacitor Clc along with the liquid crystal layer 3, and thereby an applied voltage is maintained after the first thin film transistor and the second thin film transistor are turned off.

The upper stem 191a2 of the first pixel electrode 191a receives a data voltage from the connection conductor 135a, and the upper stem 191b2 of the second pixel electrode 191b receives a voltage of the voltage transmitting line 172 through the branch 191b4 connected to a portion of the branch 191b3 of the lower stem 191b1.

The bridge 192 is connected to the second source electrode 173b protruded from the voltage transmitting line 172 through the contact hole 182m1. The bridge 192 extends in the transverse direction past three or more neighboring pixels PX and is connected to second source electrodes 173b of three or more pixels PX through contact holes 182m1. The bridge 192 further includes a longitudinal portion extending in the longitudinal direction. As shown in FIG. 10, the longitudinal portion extends in the longitudinal between the voltage transmitting line 172 and the sensing signal line 177. The bridge 192 is electrically connected to the expansion of the control source electrode 173m through the contact hole 182m2 at an end portion of the longitudinal portion.

The bridge 193p electrically connects the gate line 121 and the light sensing gate electrode 124p through the contact holes 183p1 and 183p3, and electrically connects the gate line 121 and the sensing gate electrode 124s through the contact holes 183p1 and 183p2.

The bridge 194p electrically connects the light sensing drain electrode 175p and the control gate electrode 124m through the contact holes 184p1 and 184p2.

The bridge 196p electrically connects the reset signal line 121r and the light sensing source electrode 173p through the contact holes 186p1 and 186p2.

The sensing element Qp, the sensing capacitor Cs, the reference capacitor Cref, the control thin film transistor Qm, and the sensing thin film transistor Qs form a sensing unit SU.

According to an exemplary embodiment of the present invention, the sensing unit SU neighbors the pixel PX including the display elements, such as the first and second pixel electrodes 191a and 191b and the first and second thin film transistors Qa and Qb, with the voltage transmitting line 172 interposed between the sensing unit SU and the pixel PX. The control thin film transistor Qm of the sensing unit SU is connected to the voltage transmitting line 172 connected to the second thin film transistor Qb of the neighboring pixel PX thereby receiving a voltage such that it is not necessary to form an additional voltage transmitting line for the sensing unit SU. Accordingly, the aperture ratio and the transmittance of the display device including the sensing unit SU can be improved.

The upper panel 200 includes a light blocking member 220 which is formed on a substrate 210 made of glass or plastic. The light blocking member 220 prevents light leakage between the pixel electrodes including the first and second pixel electrodes 191a and 191b and defines an opening region facing the pixel electrode.

A plurality of color filters 230 are formed on the substrate 210 and the light blocking member 220. Most of the color filter 230 is formed in a region enclosed by the light blocking member 220 and extends along the pixel electrode row including the first and second pixel electrodes 191a and 191b.

An overcoat 250 is formed on the color filter 230 and the light blocking member 220. The overcoat 250 is made of an (organic) insulating material, and prevents the color filter 230 from being exposed. According to an embodiment, the overcoat 250 is omitted.

According to an exemplary embodiment, at least one of the light blocking member 220 and the color filter 230 is positioned on the lower panel 100.

The liquid crystal layer 3 between the lower panel 100 and the upper panel 200 includes liquid crystal molecules having positive dielectric anisotropy. The liquid crystal molecules are aligned such that axes of the liquid crystal molecules are perpendicular to a surface of the display panels 100 and 200 while no electric field is applied to the liquid crystal molecules.

Alignment layers 11 and 21 are formed on surfaces of the low and upper panels 100 and 200, which contact the liquid crystal layer 3 and control the alignment of the liquid crystal molecules of the liquid crystal layer 3.

Figure 12:
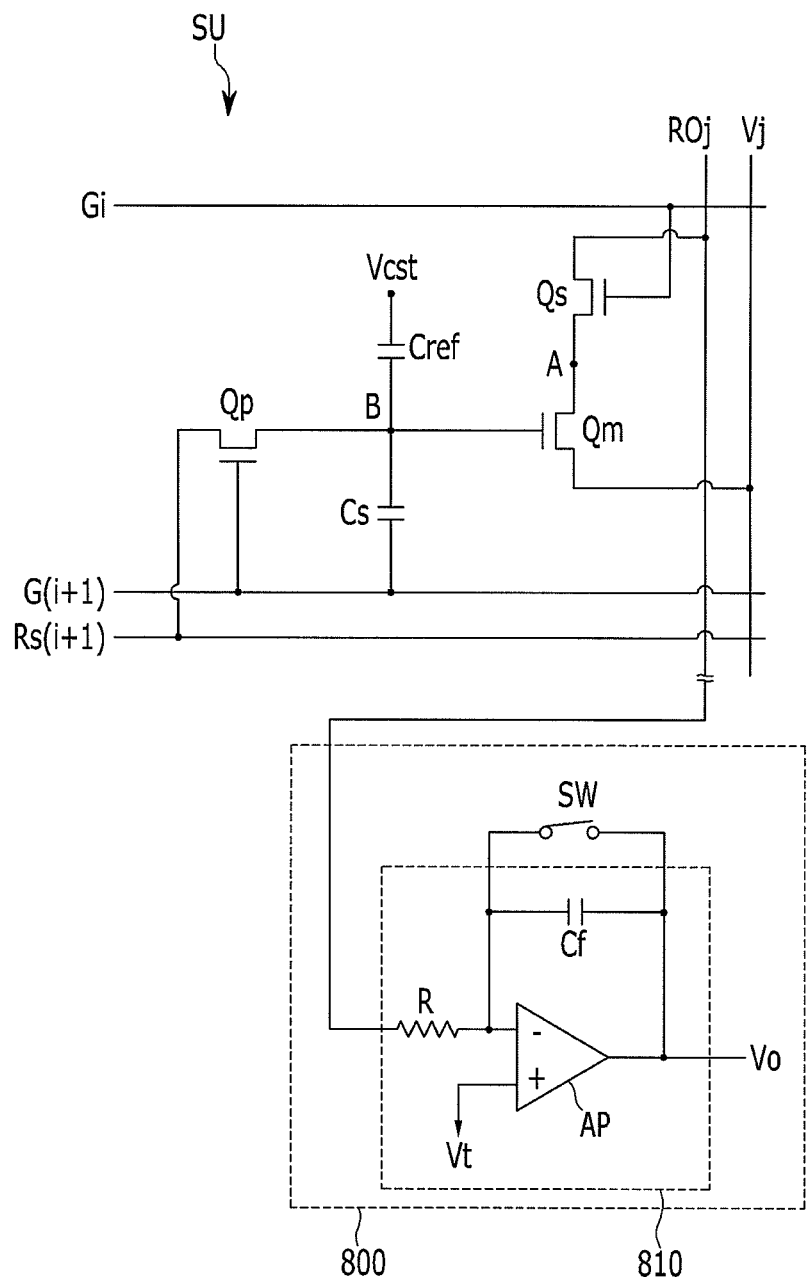
FIG. 12 is an equivalent circuit diagram of a sensing unit and a sensing signal processor of a display device according to an exemplary embodiment of the present invention.

FIG. 12 is an equivalent circuit diagram of a sensing unit and a sensing signal processor of a display device according to an exemplary embodiment of the present invention.

The sensing unit SU shown in FIG. 12 is substantially the same as the sensing unit SU shown in FIG. 4 except for the position of the reference capacitor Cref. Referring to FIG. 12, two terminals of the reference capacitor Cref included in the sensing unit SU are connected to the node B and a storage voltage Vcst. The storage voltage Vcst is a common voltage Vcom. The reference capacitor Cref is connected not to the voltage transmitting line Vj but to the storage voltage Vcst which is a predetermined voltage such that the voltage of the node B can be prevented from being affected by the voltage change of the voltage transmitting line Vj. The storage voltage Vcst is transmitted through the storage electrode line 131 shown in FIG. 10.

Figure 13:
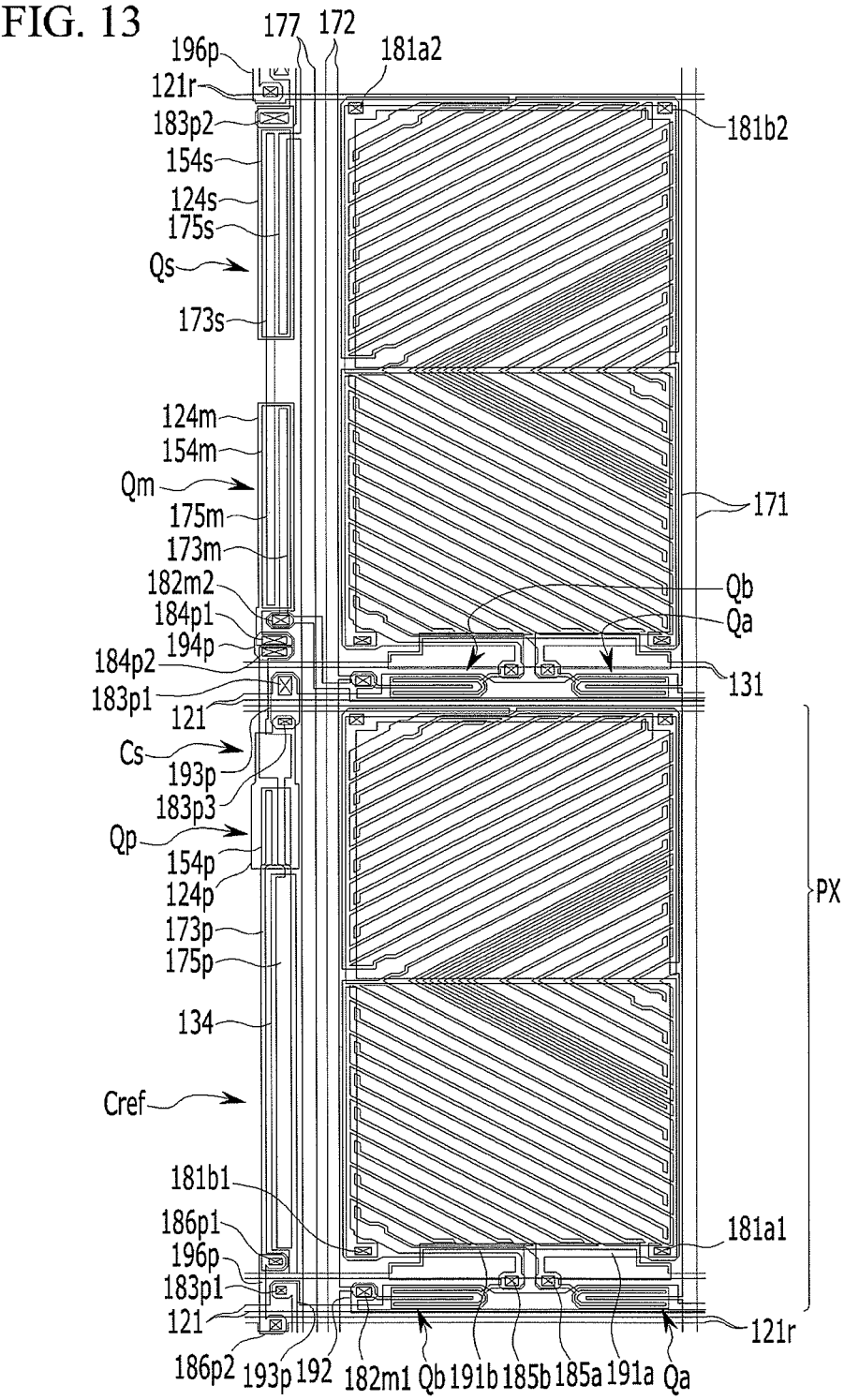
FIG. 13 is a layout view of a sensing unit and a pixel of a display device according to an exemplary embodiment of the present invention.
Figure 14:
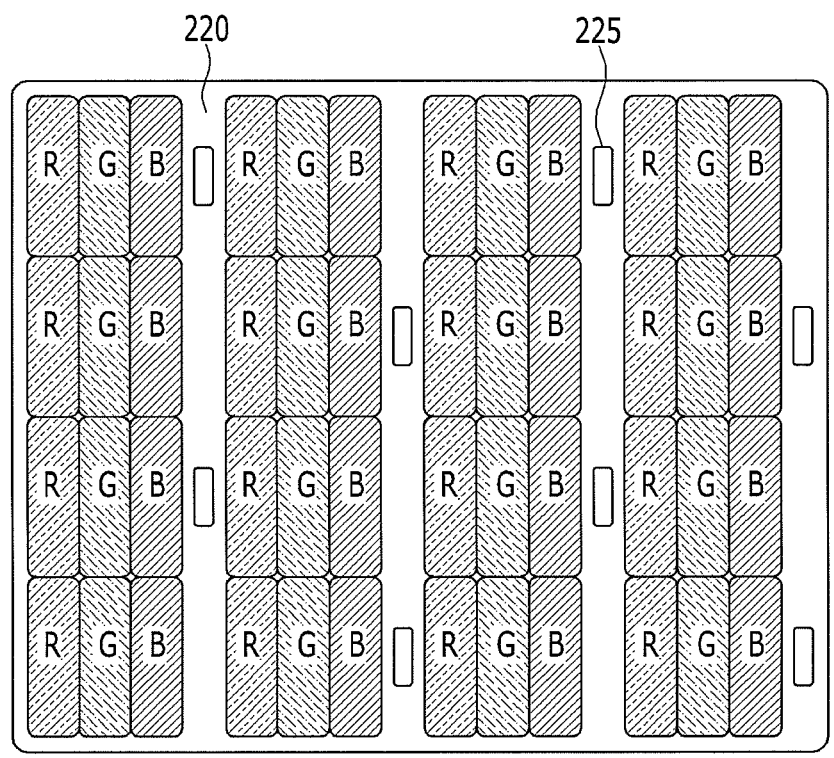
FIG. 14 is a layout view of a display device according to an exemplary embodiment of the present invention.

FIG. 13 is a layout view of a sensing unit and a pixel of a display device according to an exemplary embodiment of the present invention, and FIG. 14 is a layout view of a display device according to an exemplary embodiment of the present invention.

The structure of the display device described in connection with FIGS. 13 and 14 is substantially the same as the structure of the display device described in connection with FIG. 10 and FIG. 11.

Referring to FIG. 13, the first and second drain electrodes 175a and 175b each include a curved end portion enclosing each of the first and second source electrodes 173a and 173b and a wide end portion. The wide end portion of the first and second drain electrodes 175a and 175b overlaps the storage electrode line 131 thereby forming a storage capacitor. The storage capacitor maintains a voltage of the first and second pixel electrodes 191a and 191b.

The storage electrode line 131 further includes a storage electrode 134 protruded and extended from a portion of the storage electrode 131.

In the exemplary embodiment described in connection with FIG. 10 and FIG. 11, the control source electrode 173m includes an expansion. According to the present exemplary embodiment of FIG. 13, however, the light sensing drain electrode 175p includes an expansion forming the sensing capacitor Cs and an expansion overlapping the storage electrode 134 with the gate insulating layer 140 interposed between the expansion of the electrode 175p and the storage electrode 134, thereby forming the reference capacitor Cref.

According to an embodiment, a circuit configuration of the sensing unit SU shown in FIG. 13 is the same as the circuit configuration of the sensing unit SU shown in FIG. 12.

As shown in FIG. 13, a vertical direction length of a region where one sensing unit SU is formed is the same or substantially the same as a vertical direction length of two pixels PX adjacent to each other in the vertical direction. As such, one sensing unit SU is formed to be adjacent to two pixels PX such that a horizontal direction width of the several elements included in the sensing unit SU is reduced, and the entire horizontal direction width of the sensing unit SU is reduced, thereby resulting in an increase in the aperture ratio of the display device.

Referring to FIG. 14, as in the exemplary embodiment described in connection with FIG. 3, a sensing unit SU column which includes sensing units SU arranged in one line in the column direction is disposed for every dot. One dot includes a red pixel (R), a green pixel (G), and a blue pixel (B) as shown in FIG. 14. According to an embodiment, one dot includes a pixel representing a different color (e.g., white) as well as R, G, and B pixels. A plurality of sensing units SU in a first sensing unit SU column are arranged in such a manner that one sensing unit SU is assigned for every two dots. A plurality of sensing units SU in a second sensing unit SU column adjacent to the first sensing unit SU column are arranged so that a virtual horizontal direction axis of the sensing unit in the first sensing unit column deviates from a virtual horizontal direction axis of the sensing unit in the second sensing unit column. For example, sensing units SU in the even-numbered sensing unit SU columns are arranged on the same horizontal lines, and sensing units SU in the odd-numbered sensing unit SU columns are arranged on the same horizontal lines.

According to an exemplary embodiment, a light blocking member 220 covers regions between dots adjacent to each other in the horizontal direction and regions where the sensing units SU are formed. The light blocking member 220 includes opening regions (corresponding to R, G, and B regions) facing the first and second pixel electrodes 191a and 191b and opening regions 225 exposing the sensing elements Qp of the sensing units SU. The sensing element Qp senses external light irradiated through the opening region 225 of the light blocking member 220.

Figure 15:
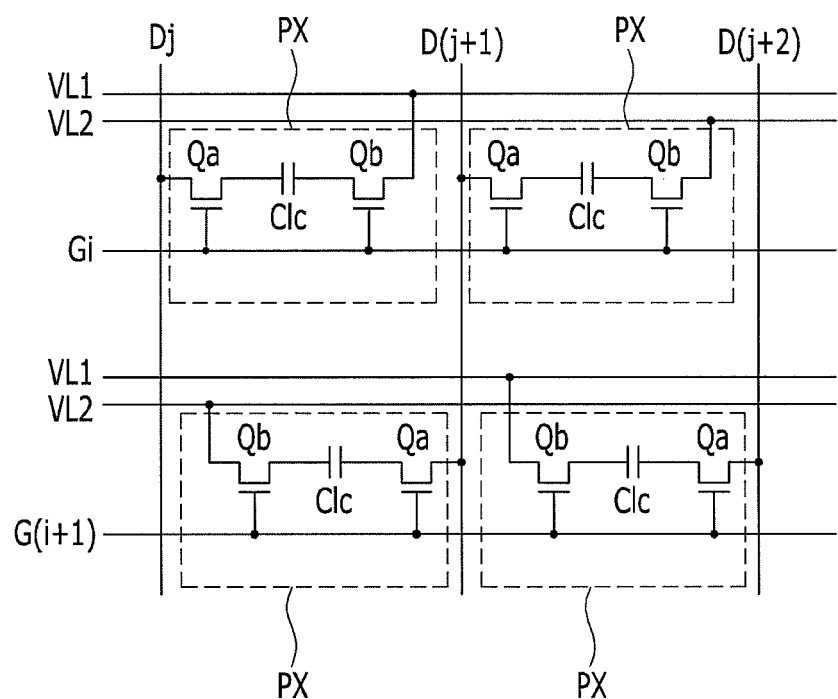
FIG. 15 is an equivalent circuit diagram of four neighboring pixels of a display device according to an exemplary embodiment of the present invention.
Figure 16:
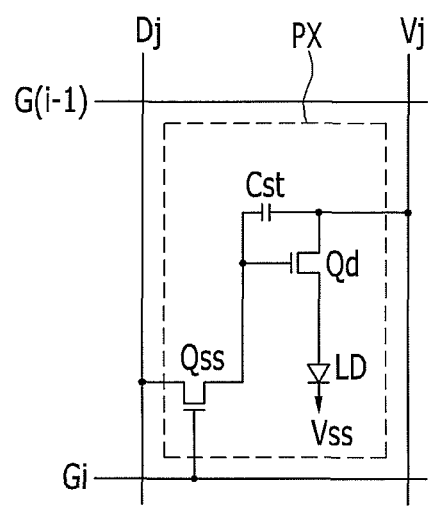
FIG. 16 is an equivalent circuit diagram of one pixel of a display device according to an exemplary embodiment of the present invention.

Next, referring to FIG. 15 and FIG. 16, a structure of a display panel 300 according to an exemplary embodiment of the present invention is described.

FIG. 15 is an equivalent circuit diagram of four neighboring pixels of a display device according to an exemplary embodiment of the present invention.

Referring to FIG. 15, a display device according to an exemplary embodiment is provided. The display device has substantially the same structure as the display devices described in connection with FIGS. 1 to 14 except for the structure of the voltage transmitting line. Different from the voltage transmitting line Vj extending parallel to the data line Dj in the column direction in the previous exemplary embodiments described in connection with FIGS. 1 to 14, in the present exemplary embodiment of FIG. 15, voltage transmitting lines VL1 and VL2 are extended parallel not to the data lines Dj, D(j+1), and D(j+2) in the column direction, but to the gate lines Gi and G(i+1) in the row direction. The voltage transmitting lines VL1 and VL2 include a first voltage transmitting line VL1 and a second voltage transmitting line VL2. The first voltage transmitting line VL1 and the second voltage transmitting line VL2 respectively transmit the first voltage V1 and the second voltage V2. The first and second voltage transmitting lines VL1 and VL2 alternately transmit the first voltage V1 and the second voltage V2, which are different from each other, at least every frame. The first and second voltages V1 and V2 are the same as the first voltage V1 and the second voltage V2 according to the previous exemplary embodiments described in connection with FIGS. 1 to 14.

The voltage transmitting lines VL1 and VL2 are formed for every pixel PX row or every plurality of pixel PX rows.

As shown in FIG. 15, the second switching elements Qb of the neighboring pixels PX in the row direction or the column direction are respectively connected to the first and second voltage transmitting lines VL1 and VL2 or the second and first voltage transmitting lines VL2 and VL1. Accordingly, the neighboring pixels PX receive data voltages having different polarities with respect to the first voltage V1 or the second voltage V2, thereby realizing dot inversion driving.

The control switching elements Qm of the sensing units SU of the display devices in the above various exemplary embodiments described in connection with FIGS. 1 to 14 are connected to the voltage transmitting lines VL1 and VL2 shown in FIG. 15.

FIG. 16 is an equivalent circuit diagram of one pixel of a display device according to an exemplary embodiment of the present invention.

According to an embodiment, the display device includes an organic light emitting device (OLED). Referring to FIG. 16, a pixel PX includes a switching transistor Qss connected to a gate line Gi and a data line Dj, a storage capacitor Cst connected to the switching transistor Qss, a driving transistor Qd connected to the switching transistor Qss and a voltage transmitting line Vj, and a light-emitting device LD connected to the driving transistor Qd.

According to an exemplary embodiment, the voltage transmitting line Vj delivers a driving voltage Vdd.

According to an embodiment, the light-emitting device LD includes an organic light emitting diode. The light-emitting device LD includes an anode connected to an output terminal of the driving transistor Qd and a cathode connected to a common voltage Vss. The light-emitting device LD emits light by changing intensity according to an output current of the driving transistor Qd, thereby displaying an image.

While the embodiments of the present invention have been described, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a plurality of pixels;
   a voltage transmitting line through which a first voltage is transmitted to a first pixel among the plurality of pixels;
   a data line through which a data voltage is transmitted to the first pixel;
   a plurality of sensing units including a first sensing unit connected to the voltage transmitting line; and
   a gate line;
   a reset signal line through which a reset signal is transmitted to the first sensing unit;
   a sensing signal line to which a sensing signal is output from the first sensing unit; and
   a reference capacitor connected to a sensing capacitor,
   wherein the first pixel includes a first switching element including an input terminal connected to the voltage transmitting line and a second switching element including an input terminal connected to the data line,
   wherein the first sensing unit includes a control switching element including an input terminal connected to the voltage transmitting line,
   wherein the first sensing unit includes:
      a sensing element and the sensing capacitor both connected to a control terminal of the control switching element; and
      a sensing switching element connected to an output terminal of the control switching element,
   wherein a control terminal of the sensing element is connected to the gate line, an input terminal of the sensing element is connected to the reset signal line, and an output terminal of the sensing switching element is connected to the sensing signal line, and
   wherein the reset signal includes a reset high voltage and a reset low voltage that is lower than the reset high voltage, and wherein the reset high voltage is transmitted through the reset signal line when a gate-on voltage is transmitted through the gate line.

2. The display device of claim 1, further comprising:
a sensing signal processor connected to the sensing signal line wherein the sensing signal processor processes the sensing signal and generates a sensing output signal.

3. The display device of claim 2, wherein the first sensing unit is positioned between the first pixel and a second pixel adjacent to the first pixel in a row direction.

4. The display device of claim 3, wherein the plurality of sensing units are arranged so that one sensing unit is disposed for every two pixel rows in a column direction, and wherein the first sensing unit is adjacent to both the first pixel and a third pixel, wherein the third pixel is adjacent to the first pixel in the column direction.

5. A display device, comprising:
a plurality of pixels for displaying images;
a voltage transmitting line through which a first voltage e is transmitted to a first pixel among the plurality of pixels, the first pixel displaying an image for an input image signal;
a gate line transmitting a gate signal;
a data line through which a data voltage is transmitted to the first pixel;
a plurality of sensing units including a first sensing unit connected to the voltage transmitting line,
wherein the first pixel includes a first switching element including an input terminal connected to the voltage transmitting line and a second switching element including an input terminal connected to the data line,
wherein the first sensing unit includes a control switching element including an input terminal connected to the voltage transmitting line,
wherein a control terminal of the first switching element and a control terminal of the second switching element are commonly connected to the same gate line,
wherein the first voltage is a driving voltage,
wherein the first voltage and a second voltage different from the first voltage are alternately transmitted to the first pixel every at least one frame;
a sensing signal line to which a sensing signal is output from the sensing unit; and
a sensing signal processor connected to the sensing signal line wherein the sensing signal processor processes the sensing signal and generates a sensing output signal, wherein the sensing signal processor includes
an integrator integrating the sensing signal, and
a switch resetting the integrator after a voltage transmitted through the voltage transmitting line is changed from the first voltage to the second voltage or from the second voltage to the first voltage.

6. The display device of claim 5, wherein
the first sensing unit includes
a sensing element connected to a control terminal of the control switching element,
a sensing switching element connected to an output terminal of the control switching element,
a sensing capacitor connected to the control terminal of the control switching element, and
a reference capacitor connected to the sensing capacitor, wherein the reference capacitor is connected to the voltage transmitting line.

7. The display device of claim 5, wherein
the first sensing unit includes
a sensing element connected to a control terminal of the control switching element,
a sensing switching element connected to an output terminal of the control switching element,
a sensing capacitor connected to the control terminal of the control switching element, and
a reference capacitor connected to the sensing capacitor, wherein the reference capacitor is connected to a storage electrode line to which a common voltage is applied.

8. A driving method of a display device comprising a plurality of pixels, a plurality of gate lines including first and second gate lines, a reset signal line, a sensing signal line, a voltage transmitting line and a data line connected to a first pixel among the plurality of pixels, and a plurality of sensing units each connected to the voltage transmitting line and the first and second gate lines, wherein a sensing unit of the plurality of sensing units includes a sensing element connected to the second gate line and the reset signal line, a control switching element connected to the sensing element and the voltage transmitting line, and a sensing switching element connected to the control switching element and the sensing signal line, the method comprising:
transmitting a reset high voltage of a reset signal through the reset signal line to a control terminal of the control switching element;
sensing light irradiated to the sensing element; and
turning on the sensing switching element to transmit a sensing signal to the sensing signal line.

9. The driving method of claim 8, wherein transmitting the reset high voltage of the reset signal to the control terminal of the control switching element includes,
transmitting a gate-on voltage to the second gate line, and
transmitting the reset high voltage to the reset signal line.

10. The driving method of claim 9, wherein sensing the light includes transmitting a gate-off voltage to the first and second gate lines.

11. The driving method of claim 10, wherein transmitting the sensing signal to the sensing signal line further includes transmitting the gate-on voltage to the first gate line, and wherein the sensing switching element is turned on according to the gate-on voltage transmitted to the first gate line.

12. The driving method of claim 11, wherein the first pixel further includes a liquid crystal capacitor, wherein the liquid crystal capacitor includes a first pixel electrode connected to a first switching element connected to the voltage transmitting line, a second pixel electrode connected to a second switching element connected to the data line, and a liquid crystal layer.

13. The driving method of claim 12, further comprising alternately transmitting a first voltage and a second voltage that is smaller than the first voltage to the first pixel through the voltage transmitting line every at least one frame.

14. The driving method of claim 13, wherein the display device further includes a sensing signal processor, wherein the sensing signal processor processes the sensing signal of the sensing unit and generates a sensing output signal, and wherein the sensing output signal is reset after a voltage transmitted through the voltage transmitting line is changed.

* * * * *